Patented Aug. 16, 1932

1,872,112

UNITED STATES PATENT OFFICE

ARTHUR EDWARD BROWN, OF BRENTWOOD, ENGLAND, ASSIGNOR TO UNIVERSAL RUBBER PAVIORS LIMITED, OF AUDENSHAW, NEAR MANCHESTER, ENGLAND

COMPOSITION AND MANUFACTURE OF BITUMINOUS MIXTURES FOR USE IN ROAD CONSTRUCTION AND LIKE PURPOSES

No Drawing. Application filed March 19, 1926, Serial No. 96,091, and in Great Britain April 4, 1925.

This invention has reference to bituminous mixtures for use in floated asphalt carpets, for grouting rolled dry macadam or other hard aggregate of suitable size, for coating broken stone or slag, for jointing wood blocks, stone sets, or bricks, and/or for spraying or surfacing in the same way as that in which tar is used.

It will be readily understood that the bituminous mixtures for these several purposes will contain the ingredients in varied proportions. Bitumen which expression shall be taken to include natural, or artificial bitumen (i. e. compounded of pitch, tar, creosote, or other oils) is frequently used with the addition of a mineral filler.

We have found that certain minerals or by-products when properly prepared are particularly efficacious as fillers for bitumen and our researches tend to indicate that the principal requirements in such materials are low ultimate specific gravity, high porosity and colloidal content. We have for example, found that clays when dried and finely ground have a porosity of upwards of 52 per cent by volume and can therefore, be mixed with suitably graded bitumen in as high a proportion as 55 per cent or more of the ground clay to 45 per cent or less of the bitumen and that the compound when treated in such a manner as to effect colloidal dispersion of the filler possesses a highly fluid character when heated to a temperature of 175°–200° C. In clays are comprised surface clays, gault clays, marls, shales, aluminous infusorial earth and others.

A drawback has hitherto been found in the use of some mechanically ground materials such as cement, slate, limestone, etc., when used as fillers in that the mixtures of bitumen and filler when stored will settle out, the upper layers containing less and the lower layers more of the filler after a period of time. It will be understood that this defect is or may be due to the absence of colloidal properties in these materials, or to the difficulty of grinding them by mechanical means sufficiently finely to ensure the particles all or nearly all remaining in suspension in the plastic bitumen, or to their high specific gravity.

It is a characteristic however, of clays that the silicate of alumina or true clay substance contained in them is colloidal in character.

We have found that if we pulverize clay to a degree of fineness which will allow at least 95% to 98% to pass a 200 mesh sieve, i. e., a sieve containing 200 holes per lineal inch or 40,000 per square inch, we can mix same with liquid bitumen, and obtain a colloidal dispersion of the true clay substance, without recourse to water or other agent as a dispersal medium, provided the hydroscopic water is removed from the clay and the requisite temperature and suitable mechanical means of mixing, not of a high speed order, are employed.

We have found that there are, as yet, no economical means of grinding clay to such fineness so long as the hygroscopic water normally contained in same is present, even though the clay is otherwise dry. We therefore, prefer to expel the hygroscopic water from the clay before and/or during the final grinding and this we do by exposing the clay before grinding (in a state of lumps or partially crushed or pulverized) and/or during grinding, to dry heat, of 300–400 degrees centigrade, through a lower temperature of say not less than 105° C. would be sufficient but the drying would then be too slow for most practical purposes. We have found that we can obtain a similar result using clay of the same fineness but containing hygroscopic water by expelling the hygroscopic water during the mixing operation with liquid bitumen by performing the said mixing at a sufficiently high temperature, say about 175°–200° C. The consistency of the product may be varied by the addition of an oil flux in the known manner.

A mixer suitable for effecting the colloidal dispersion of the clay in the bitumen, consists of an arrangement of perforated paddle-like beaters, mounted to rotate about a horizontal axis and partly submerged in the mixture, the beaters being rotated at a slow perpiheral speed, say about 450 feet per minute on a five foot diameter.

The beaters beat or thrash the mixture and cause constant agitation, which releases oils or moisture volatilized by the heat, and at the same time ensures complete dispersion of the clay substance in the bitumen.

Where the hygroscopic water has been completely removed from the clay, mixing with the bitumen may be effected at a temperature between 80° C. and 100° C. or at any temperature at which the bitumen is sufficiently liquid. If the clay has regained some of its hygroscopic water, the temperature of mixing must be sufficiently high, say about 175°–200° C. as already stated, to ensure the expulsion of the hygroscopic water during the mixing. A lower temperature say even 105° C. could be used, but the mixing would then be unduly prolonged as the dispersal of the hygroscopic water would be so much slower.

The invention further consists in the addition to bituminous mixtures for use in road construction and the like, containing bitumen, of "a rubber-like pitch" by which expression is meant the residual products of the manufacture of gutta percha and balata, known commercially as "gutta percha pitch" and "balata pitch", or a mixture of them.

The by-products of gutta percha and balata, called in England gutta percha pitch and balata pitch, are the resins removed in the manufacture of raw gutta percha and raw balata in purification for commercial use.

In one example of the manufacture of the improved material containing a resinous product and for the purpose of surface dressing a concrete or asphalt roadway, the ingredients and proportions are as follows:—

| | Parts by weight |
|---|---|
| Bituminous mixture containing finely divided clay colloidably dispersed according to the invention | 92 |
| Gutta percha pitch | 8 |
| | 100 |

The bituminous mixtures, prepared according to our invention are found to possess properties of great value and importance in all applications of bitumen to road surfacing and the like. They are more adhesive than other known mixtures and do not peel off or separate from stone or other materials, when cold. They are more tenacious, i. e. have greater binding power. They have higher melting points and do not sweat. They remain plastic at lower temperatures and do not harden, polish or become brittle, or slippery. The above properties remain unchanged during greatly extended periods and are unaltered by the effects of exposure to climatic conditions. Roads constructed with them are more durable, less liable to wave formation, do not break up, and cost less for maintenance and repair.

What I claim is—

1. An improved bituminous mixture for use in road construction and the like comprising in combination bitumen and a rubber-like pitch, as set forth.

2. A bituminous mixture comprising bitumen, a filler of clay, colloidally dispersed therein, free from hygroscopic water and so fine that at least 95% to 98% would have passed through a 200 mesh sieve, and a rubber-like pitch, as set forth.

3. The improved bituminous mixture according to claim 2, comprising 92 parts by weight of clay-filled bitumen and 8 parts by weight of gutta percha pitch.

In testimony whereof I have signed my name to this specification.

ARTHUR EDWARD BROWN.